(12) United States Patent
Pinard et al.

(10) Patent No.: US 7,375,857 B1
(45) Date of Patent: May 20, 2008

(54) PRINT PROOFING WITH COLOR AND SCREEN MATCHING

(75) Inventors: Adam I. Pinard, Carlisle, MA (US); James M. Enge, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 572 days.

(21) Appl. No.: 09/667,900

(22) Filed: Sep. 22, 2000

(51) Int. Cl.
*G06K 15/00* (2006.01)
*H04N 1/40* (2006.01)

(52) U.S. Cl. ..................... 358/3.21; 358/3.24

(58) Field of Classification Search .......... 358/1.6, 358/3.09, 3.14, 3.16, 3.17, 3.19, 534, 536, 358/504, 1.9, 517, 518; 382/237
See application file for complete search history.

(56) References Cited

U.S. PATENT DOCUMENTS

| | | | |
|---|---|---|---|
| 1,157,092 A | 10/1915 | Du Rell | |
| 1,924,038 A | 8/1933 | Herbsman et al. | |
| 3,261,593 A | 7/1966 | Sharples | 259/4 |
| 3,291,456 A | 12/1966 | Deane | 259/4 |
| 3,620,507 A | 11/1971 | Kruka | 259/4 |
| 3,647,295 A | 3/1972 | Dobouney | 355/38 |
| 3,798,656 A | 3/1974 | Lowy et al. | 346/1 |
| 4,123,800 A | 10/1978 | Mazzei | 366/150 |
| 4,196,437 A | 4/1980 | Hertz | 346/1.1 |
| 4,199,769 A | 4/1980 | Fischbeck | 346/140 |
| 4,270,576 A | 6/1981 | Takeda et al. | 137/888 |
| 4,285,367 A | 8/1981 | Nommensen | 137/888 |
| 4,337,032 A | 6/1982 | Duplouy et al. | 432/106 |
| 4,345,841 A | 8/1982 | Day | 366/2 |
| 4,415,275 A | 11/1983 | Dietrich | 366/165 |
| 4,486,102 A | 12/1984 | Thiele et al. | 366/182 |
| 4,519,423 A | 5/1985 | Ho et al. | 137/888 |
| 4,591,875 A | 5/1986 | McCann | 346/75 |
| 4,607,261 A | 8/1986 | McCann | 346/75 |

(Continued)

FOREIGN PATENT DOCUMENTS

EP 0 533 593 A2 3/1993

(Continued)

OTHER PUBLICATIONS

Coleman, Stan et al. "Prinergy 1.1 Solutions Guide" Document No. 75-0391C, Jul. 2000, CreoScitex.

(Continued)

*Primary Examiner*—David Moore
*Assistant Examiner*—James A. Thompson
(74) *Attorney, Agent, or Firm*—Nelson Adrian Blish (57) ABSTRACT

A proof generation method is disclosed for proof printers. The method includes receiving halftoned primary color print data to be printed on a target halftone printing press. This halftoned primary color print data has been produced by a first halftoning technique, and is at least comparable to a target halftoning technique used by the target halftone printing press. A second, different halftoning technique is also applied to the print data. The two halftoning techniques are selected to cause a dot size in data provided to the proofing printer to more closely match a dot size for the halftone printing press, and cause a proof produced by the proofing printer to substantially match the color of a print produced by the target halftone printing press.

26 Claims, 5 Drawing Sheets

U.S. PATENT DOCUMENTS

| | | | | |
|---|---|---|---|---|
| 4,614,953 | A | 9/1986 | Lapeyre | 346/140 |
| 4,633,909 | A | 1/1987 | Louboutin et al. | 137/88 |
| 4,662,759 | A | 5/1987 | Leibee et al. | 366/2 |
| 4,672,432 | A | 6/1987 | Sakurada et al. | 358/75 |
| 4,717,954 | A | 1/1988 | Fujita et al. | 358/80 |
| 4,734,711 | A | 3/1988 | Piatt et al. | 346/75 |
| 4,771,297 | A | 9/1988 | Lecheheb et al. | 346/140 |
| 4,809,015 | A | 2/1989 | Bowling et al. | 346/75 |
| 4,811,035 | A | 3/1989 | Huliba et al. | 346/75 |
| 4,814,788 | A | 3/1989 | Davies | 346/75 |
| 4,853,708 | A | 8/1989 | Walters | 346/75 |
| 4,860,787 | A | 8/1989 | Grosselin | 137/487.5 |
| 4,862,192 | A | 8/1989 | Slomianny | 346/75 |
| 4,875,055 | A | 10/1989 | McCann et al. | 346/75 |
| 4,879,565 | A | 11/1989 | Fujii | 346/75 |
| 4,924,301 | A | 5/1990 | Surbrook | 358/75 |
| 4,955,065 | A | 9/1990 | Ulichney | 382/50 |
| 5,029,107 | A | 7/1991 | Lee | 364/518 |
| 5,124,803 | A | 6/1992 | Troxel | 358/298 |
| 5,126,752 | A | 6/1992 | Weinberg | 346/1.1 |
| 5,278,678 | A | 1/1994 | Harrington | 358/518 |
| 5,293,539 | A | 3/1994 | Spence | 358/527 |
| 5,296,947 | A * | 3/1994 | Bowers | 358/527 |
| 5,309,246 | A | 5/1994 | Barry et al. | 358/298 |
| 5,333,069 | A * | 7/1994 | Spence | 358/517 |
| 5,342,821 | A | 8/1994 | Pearce | 503/227 |
| 5,380,164 | A | 1/1995 | Fry et al. | 417/250 |
| 5,394,177 | A | 2/1995 | McCann et al. | 347/7 |
| 5,424,766 | A | 6/1995 | Anderson | 347/7 |
| 5,450,111 | A | 9/1995 | Mutoh | 347/78 |
| 5,455,614 | A | 10/1995 | Rhodes | 347/74 |
| 5,459,497 | A | 10/1995 | Manning et al. | 347/6 |
| 5,463,471 | A | 10/1995 | Chou | 358/298 |
| 5,473,439 | A | 12/1995 | Pappas | 358/298 |
| 5,483,625 | A | 1/1996 | Robertson et al. | 395/117 |
| 5,526,026 | A | 6/1996 | Bowers | 347/6 |
| 5,541,743 | A * | 7/1996 | Shiomi et al. | 358/534 |
| 5,550,647 | A | 8/1996 | Koike | 358/462 |
| 5,553,171 | A | 9/1996 | Lin et al. | 382/299 |
| 5,572,632 | A | 11/1996 | Laumeyer et al. | 395/116 |
| 5,585,841 | A * | 12/1996 | Hardin | 348/163 |
| 5,602,572 | A * | 2/1997 | Rylander | 358/3.09 |
| 5,633,990 | A | 5/1997 | Housel | 395/109 |
| 5,640,254 | A | 6/1997 | Sexton | 358/536 |
| 5,646,656 | A | 7/1997 | Leonhardt et al. | 347/43 |
| 5,671,340 | A | 9/1997 | Chapman et al. | 395/101 |
| 5,682,191 | A | 10/1997 | Barrett et al. | 347/104 |
| 5,685,639 | A | 11/1997 | Green | 366/139 |
| 5,687,300 | A | 11/1997 | Cooper | 395/109 |
| 5,688,046 | A | 11/1997 | Triassi et al. | 366/152.2 |
| 5,696,612 | A | 12/1997 | Thornton | 358/534 |
| 5,696,889 | A | 12/1997 | Morikawa | 395/109 |
| 5,705,060 | A | 1/1998 | Robberts | 210/198.1 |
| 5,729,664 | A | 3/1998 | Ishikawa | 395/109 |
| 5,734,484 | A | 3/1998 | Yamamoto et al. | 358/500 |
| 5,734,801 | A | 3/1998 | Noguchi et al. | 395/109 |
| 5,748,858 | A | 5/1998 | Ohtsuka et al. | 395/109 |
| 5,751,433 | A | 5/1998 | Narendranath et al. | 358/298 |
| 5,751,434 | A | 5/1998 | Narendranath et al. | 358/298 |
| 5,760,928 | A | 6/1998 | Motoyama et al. | 358/501 |
| 5,781,709 | A * | 7/1998 | Usami et al. | 358/1.9 |
| 5,786,907 | A | 7/1998 | Lotspiech | 358/518 |
| 5,805,734 | A | 9/1998 | Ebner | 382/237 |
| 5,806,430 | A | 9/1998 | Rodi | 101/484 |
| 5,825,986 | A | 10/1998 | Ferguson | 395/109 |
| 5,838,333 | A | 11/1998 | Matsuo | 345/431 |
| 5,844,688 | A | 12/1998 | Shimizu et al. | 358/296 |
| 5,845,056 | A | 12/1998 | Köhler et al. | 395/109 |
| 5,854,883 | A | 12/1998 | Madeley | 395/109 |
| 5,855,433 | A | 1/1999 | Velho et al. | 382/162 |
| 5,899,605 | A * | 5/1999 | Caruthers et al. | 399/223 |
| 5,949,965 | A * | 9/1999 | Gondek | 358/1.9 |
| 5,953,988 | A * | 9/1999 | Vinck | 101/129 |
| 5,978,555 | A | 11/1999 | Inoue | 395/109 |
| 6,026,216 | A | 2/2000 | Ohtsuka et al. | 395/109 |
| 6,052,195 | A | 4/2000 | Mestha et al. | 356/425 |
| 6,060,208 | A | 5/2000 | Wang | 430/201 |
| 6,072,592 | A | 6/2000 | Ashworth | 358/1.9 |
| 6,075,614 | A | 6/2000 | Ohtsuka | 358/1.1 |
| 6,096,472 | A | 8/2000 | Niemeyer | 430/201 |
| 6,099,113 | A | 8/2000 | Blouin et al. | 347/85 |
| 6,801,336 | B1 | 10/2004 | Cook et al. | 358/1.9 |
| 7,262,879 | B2 * | 8/2007 | Chang | 358/1.9 |
| 2002/0171873 | A1 * | 11/2002 | Chang | 358/3.06 |
| 2003/0058291 | A1 | 3/2003 | Pinard et al. | 347/15 |

FOREIGN PATENT DOCUMENTS

| | | |
|---|---|---|
| EP | 0 533 593 A3 | 3/1993 |
| EP | 0 533 593 B1 | 3/1993 |
| EP | 0556 133 A2 | 8/1993 |
| EP | 0 790 548 A1 | 8/1997 |
| EP | 0 800 309 A2 | 10/1997 |
| EP | 0 820 187 A2 | 1/1998 |
| EP | 0 820 187 A3 | 1/1998 |
| EP | 0 770 228 B1 | 11/1998 |
| EP | 1 033 256 A2 | 9/2000 |
| WO | WO 01/17231 A1 | 3/2001 |

OTHER PUBLICATIONS

"Color Proofing System, Product Bulletin" Document No. 75-0024A-D, Release Date: Jun. 16, 1997, Creo.

"Color Proofing System (CPS) User Guide" Creo Products, Inc., 1997, revised Sep. 14, 1999.

"Proofing with Spot Colors in Prinergy DRAFT Technical Bulletin" Document No. 78-0059A, Release Date: Mar. 30, 2000, Heidelberg USA, Inc. and Creo Products, Inc.

* cited by examiner

PRINT PROOFING WITH COLOR AND SCREEN MATCHING

FIELD OF THE INVENTION

This invention relates to apparatus and methods for creating proofs of documents to be printed on printing presses.

BACKGROUND OF THE INVENTION

Conventional halftoning is an amplitude modulated process in which continuous shading is simulated by varying the size of equally-spaced printed dots. The resolution at which the dots are placed is called the line screen ruling. The dots are typically oriented at an angle with respect to the print substrate, and this angle is called the screen angle. In grayscale images, the screen angle is typically 45°, which makes the resulting halftone pattern less noticeable to the human eye. For color images, each of the primary colors (usually cyan, magenta, yellow, and black—CMYK) are printed at different screen angles in order to minimize color shifts due to misregistration during the printing process. The angles are carefully selected for each color in order to minimize the occurrence of interference patterns called Moiré (typical screen angles are C=15°, M=75°, Y=0°, K=45°).

Proofing is the process of generating a sample print, which represents the output that can be expected from a printing press. Proofing printers ("proofers") are relatively inexpensive printers that strive to accurately represent the press output, including its color and quality. Color management for proofing devices is very important, because such devices generally use different color inks or donors than do the printing presses (Proofer CMYK≠Press CMYK). And even if a proofing device were to use the same color primaries as a particular press, such a device may not be usable with other presses. This is because not all of them use primary inks with the same hues, with American and European presses exhibiting significant differences in this area. Proofers may also need to match specialty or "spot" colors, which are essentially $5^{th}$ or $6^{th}$ colors used by the press for colors that the press's primary colors cannot reproduce well or at all.

In order to produce a color match on the proofer, the image data is typically color corrected before halftone processing. This process results in different data sets being halftone processed for the proofer and the press. Even if the same halftoning technique is used for both machines, the resulting halftone pattern for the two devices will be slightly different in order to make up for the color mismatch.

Some proofing devices focus on matching the color of the press, but appear not to be completely accepted because they use different halftoning techniques than the press. The feeling is that proofs from these devices cannot be used to predict the Moiré that can be expected on the press. Other proofing devices focus on matching the halftoning technique of the press as exactly as possible, but tend not to produce a good color match.

SUMMARY OF THE INVENTION

In one general aspect, the invention features a proof generation method for proof printers. This method includes receiving print data to be printed on a target halftone printing press to which a first halftoning technique has been applied, with the first halftoning technique being at least comparable to a target halftoning technique used by the target halftone printing press. A second halftoning technique is applied to the print data, wherein the first and second halftoning techniques are different, and the data is provided to a proofing printer different from the target halftone printing press.

In preferred embodiments, the step of applying a first halftoning technique can apply a half-toning technique that employs constantly spaced dots of variable sizes and the step of applying a second halftoning technique can apply a stochastic halftoning technique to the constantly spaced dots of variable sizes. The print data can be color print data including a plurality of color-separated data subsets and with the step of applying a first halftoning technique and the step of applying a second halftoning technique being applied to the data subsets. The step of applying a first halftoning technique can employ dots from a first set of primary colors with the step of applying a second halftoning technique adding at least a second of the primary colors to a portion of one or more of the dots assigned to a first of the primary colors based on the first halftoning technique. The step of applying a first halftoning technique can employ dots from a first set of primary colors with the step of applying a second halftoning technique adding at least a first additional color to a portion of one or more of the dots assigned to a first of the primary colors based on the first halftoning technique. The step of applying a first halftoning technique can employ dots from a first set of primary colors with the step of applying a second halftoning technique adding at least a first additional color to a portion of one or more of the dots assigned to a first of the primary colors based on the first halftoning technique. The method can further include the steps of receiving a target printing press selection command and selecting parameters for the second halftoning technique based on the target printing press selection command. The step of applying a first halftoning technique and the step of applying a second halftoning technique can be applied as part of a single simultaneous process. The method can further include the step of printing the data with an ink-jet proofing printer different from the target halftone printing press. The step of applying a first halftoning technique can employ dots with the step of applying a second halftoning technique resulting in lightening colorant values for at least some areas of at least some of the dots from the first halftoning technique. The step of applying a first halftoning technique can employ dots with the step of applying a second halftoning technique causing the complete lightening of colorant values for at least some areas of at least some of the dots from the first halftoning technique. The step of applying a first halftoning technique can employ dots with the step of applying a second halftoning technique causing the substitution of colorant from at least some areas of at least some of the dots from the first halftoning technique with a different colorant. The step of applying a first halftoning technique can employ dots with the step of applying a second halftoning technique causing the overlaying of a different colorant on at least some areas of at least some of the dots from the first halftoning technique. The step of applying a first halftoning technique can employ dots with the step of applying a second halftoning technique causing the creation of a plurality of areas of a same color within at least some of the dots from the first halftoning technique. The step of applying a first halftoning technique can employ dots with the step of applying a second halftoning technique causing the creation of a plurality of areas as individual pixels. The step of applying a first halftoning technique can employ dots with the step of applying being applied to the dots corresponding to a spot color defined by the print data to match the spot color.

In another general aspect, the invention features a proof generation apparatus for proof printers that includes a print data input responsive to a first halftone processor employing a first halftone technique, with the first halftoning technique being at least comparable to a target halftoning technique used by the target halftone printing press. The apparatus includes a second halftone processor employing a second halftone technique, with the first and second halftoning techniques being different. The apparatus further includes a processed print data output.

In a further general aspect, the invention features a proof generation apparatus for proof printers that includes means for receiving print data to be printed on a target halftone printing press from means for applying a first halftoning technique to the print data, wherein the first halftoning technique is at least comparable to a target halftoning technique used by the target halftone printing press. Also included in the apparatus are means for applying a second halftoning technique to the print data, wherein the first and second halftoning techniques are different, and means for providing the data to a proofing printer different from the target halftone printing press.

In another general aspect, the invention features a proof generation method for ink jet proof printers that includes receiving print data to be printed on a target halftone printing press to which a first halftoning technique has been applied to obtain screen image data representing a plurality of screen dots, which yield a shaded visual representation of the image when printed on a printing press. Also included are steps of creating one or more lightened areas where direct deposition of colorant is to be lightened within at least some of the screen dots to be printed but where indirect deposition colorant from overlapping areas is to remain, with the method being optimized to accurately reproduce the shaded visual image that would be printed on the printing press. The method further includes the step of providing the data to an ink-jet proofing printer different from the target halftone printing press and capable of printing the overlapping areas.

In preferred embodiments, the method can further include a step of receiving an adjustment signal and a step of adjusting parameters of the step of lightening in response to the step of receiving a user adjustment signal. The method can further include the step of printing the data with overlapping dots for the overlapping raster pattern using an ink-jet proofing printer different from the target halftone printing press. The step of creating can create the lightened areas as individual pixels. The steps of creating and providing can be adapted to produce complete overlap of the lightened areas.

In a further general aspect, the invention features a proof generation apparatus for ink jet proof printers that includes a print data input responsive to a series of screen dots from first halftone processor employing a first halftoning technique, with the plurality of dots yielding a shaded visual representation of the image when printed on a printing press. Lightening logic is also provided for creating one or more lightened areas where direct deposition of colorant is to be lightened within at least some of the screen dots to be printed but where indirect deposition colorant from overlapping areas is to remain, and wherein the apparatus is optimized to accurately reproduce a shaded visual image that would be printed on the printing press. A processed print data output provides the data to an ink-jet proofing printer different from the target halftone printing press and capable of printing the overlapping areas.

In another general aspect, the invention features a proof generation apparatus for ink jet proof printers including means for receiving print data to be printed on a target halftone printing press to which a first halftoning technique has been applied to obtain screen image data representing a plurality of screen dots, which yield a shaded visual representation of the image when printed on a printing press. Also provided are means for creating one or more lightened areas where direct deposition of colorant is to be lightened within at least some of the screen dots to be printed but where indirect deposition colorant from overlapping areas is to remain, with the apparatus being optimized to accurately reproduce the shaded visual image that would be printed on the printing press. Further provided are means for providing the data to an ink-jet proofing printer different from the target halftone printing press and capable of printing the overlapping areas.

In a further general aspect, the invention features a proof generation method for ink jet proof printers that includes receiving print data to be printed on a target halftone printing press to which a first halftoning technique has been applied, with the first halftoning technique being at least comparable to a target halftoning technique used by the target halftone printing press. Also included are steps of lightening at least one portion of each of at least some of the screen dots, adding at least one region of a second color in some of the screen dots, and providing the screen image data to a proofing printer different from the target halftone printing press.

In preferred embodiments, the step of applying a first halftoning technique, the step of lightening, and the step of adding can be applied as part of a single simultaneous process before the step of providing. The method can further include the step of printing the data with an ink-jet proofing printer different from the target halftone printing press. The step of applying a first halftoning technique can employ dots with the step of applying a second halftoning technique causing the complete lightening of colorant values for at least some areas of at least some of the dots from the first halftoning technique. The step of applying a first halftoning technique can employ dots with the step of applying a second halftoning technique causing the overlaying of colorant from at least some areas of at least some of the dots from the first halftoning technique with a different colorant. The step of applying a first halftoning technique can employ dots with the step of applying a second halftoning technique causing the creation of a plurality of areas of a same color within at least some of the dots from the first halftoning technique.

In another general aspect, the invention features a proof generation apparatus for proof printers that includes a print data input responsive to a first halftone processor employing a first halftone technique, wherein the first halftoning technique is at least comparable to a target halftoning technique used by the target halftone printing press. The apparatus also includes lightening logic for lightening at least one portion of each of at least some of the screen dots, an adder for adding at least one region of a second color in some of the screen dots, and a processed print data output.

In a further general aspect, the invention features a proof generation apparatus for proof printers that includes means for receiving print data to be printed on a target halftone printing press to which a first halftoning technique has been applied, wherein the first halftoning technique is at least comparable to a target halftoning technique used by the target halftone printing press. The apparatus also includes means for lightening at least one portion of each of at least some of the screen dots, means for adding at least one region of a second color in some of the screen dots, and means for providing the screen image data to a proofing printer different from the target halftone printing press.

In another general aspect, the invention features a proof generation method for proof printers that includes the steps of receiving print data to be printed on a target halftone printing press to which a first halftoning technique has been applied, with the first halftoning technique producing a plurality of dots and being at least comparable to a target halftoning technique used by the target halftone printing press. The method also includes the steps of altering at least a plurality of areas distributed within at least some of the dots with substantially the same color alteration, and providing the data to a proofing printer different from the target halftone printing press.

In preferred embodiments, the step of altering can alter the areas to include a same color that is different from the color of the dot. The step of altering can operate according to a set of primary colors that is adjusted to increase the altering of at least a first color by a second color in favor of a decrease in the altering of the first color by a third color that is darker than the second color. The step of altering can alter the areas to lighten the color of the dot. The step of altering can alter dots corresponding to a spot color defined by the print data to match the spot color. The method can further include the step of printing the data with an ink-jet proofing printer different from the target halftone printing press.

In a further general aspect, the invention features a proof generation apparatus for proof printers that includes a print data input responsive to a first halftone processor employing a first halftone technique, with the first halftoning technique being at least comparable to a target halftoning technique used by the target halftone printing press. Also included in the apparatus are altering logic for altering at least a plurality of areas distributed within at least some of the dots with substantially the same color alteration, and a processed print data output.

In another general aspect, the invention features a proof generation apparatus for proof printers that includes means for receiving print data to be printed on a target halftone printing press to which a first halftoning technique has been applied, with the first halftoning technique producing a plurality of dots and being at least comparable to a target halftoning technique used by the target halftone printing press. The apparatus further includes means for altering at least a plurality of areas distributed within at least some of the dots with substantially the same color alteration, and means for providing the data to a proofing printer different from the target halftone printing press.

Systems and methods according to the invention can permit better simulation by a proofer of the output of a target press. By superimposing two halftoning techniques together, such systems and methods can yield a proof that represents the halftone pattern as well as the color of the press, and this proof should allow Moiré patterns to be predicted more accurately. Predicting Moiré patterns can allow a user to correct them before undertaking the potentially expensive and time consuming task of running the print job on the press.

Systems and methods according to the invention can provide these advantages with minimal impact on the printed halftone dots. By spreading dots around and using a printer that exhibits some overlap, the visual impact of the second halftoning technique can be minimized. As a result, the proof can also more closely predict press output when inspected under magnification.

DESCRIPTION OF AN ILLUSTRATIVE EMBODIMENT

Figure 1:
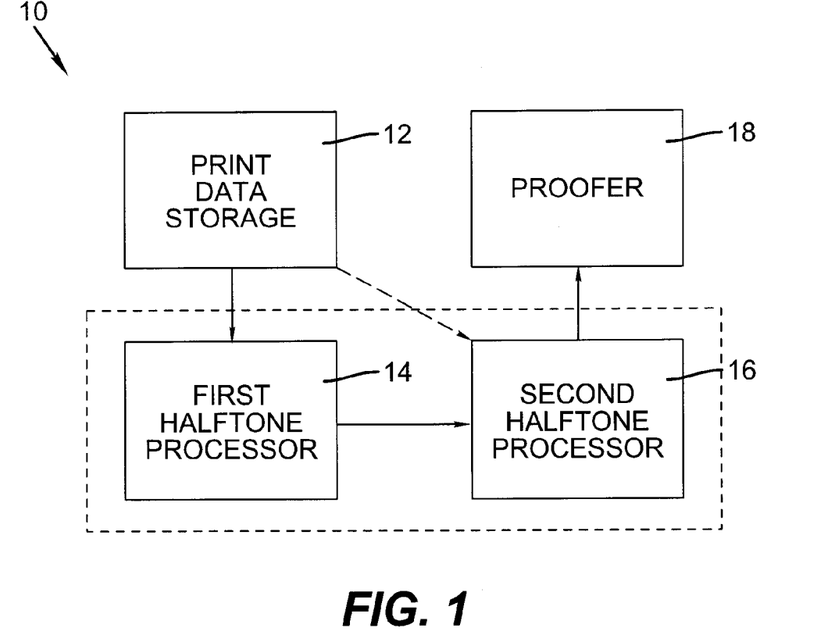
FIG. 1 is a block diagram illustrating an embodiment of a system according to the invention.
Figure 2A:
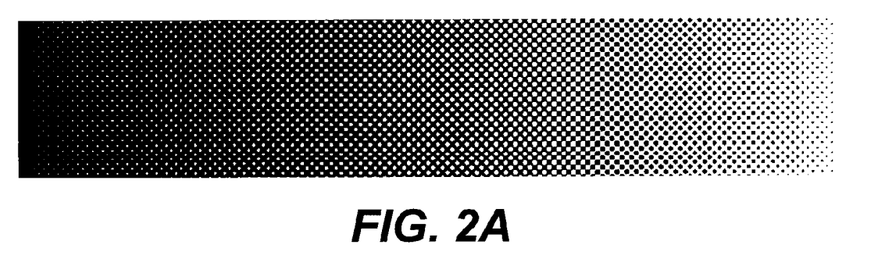
FIG. 2A is a halftoned vignette using conventional amplitude modulation of the dots.
Figure 2B:
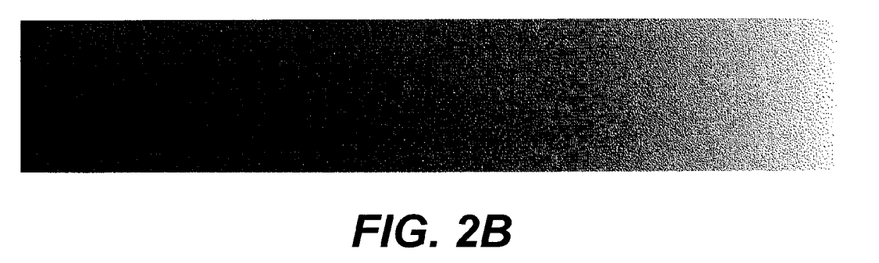
FIG. 2B is a halftoned vignette using stochastic frequency modulation of the dots.

Referring to FIGS. 1 and 2, an embodiment of a system 10 according to the invention uses two halftoning techniques together, one to match the halftone pattern of the press and the other to match the color of the press. Such a system can include a first half-tone processor 14 having an input responsive to a source of print data, such as the output of a print data storage device 12. The system can also include a second halftone processor 16 responsive to the first halftone processor and having an output provided to a proofing printer 18. The second halftone processor may also be responsive to the print data. The proofing printer can be a high-resolution ink-jet printer.

The first halftone processor 14 generally performs a conventional halftone operation, which achieves shading by varying the size of constantly spaced dots, as shown in FIG. 2A. The second halftone processor 16 typically performs a different type of halftone processing, such as a stochastic halftoning. As shown in FIG. 2B, stochastic halftoning is a frequency modulated process in which the size of the dots remains constant and their position is varied, forming a randomly placed pattern. Other types of processes, such as a Bayer process, may also be implemented by the second halftone processor.

Since the dot clusters printed by the press are typically much larger and at a lower resolution than the proofing device is capable of printing, the second halftoning process can be used to tint them. The higher the resolution of the proofing device and the smaller the spot size it can produce, the less visible the second halftoning pattern and the more continuous it appears. As discussed below, it can also beneficial to use an overlapping print pattern to further reduce visibility of the halftoning pattern.

The first and second halftone processors can be integrated within the proofer or located remotely in other pre-press hardware. They can be implemented using dedicated electronic circuitry, using a specially programmed processor, or both. In one embodiment, the halftone processors are each implemented using a software module on a workstation-class computer connected to the proofer. Note that in at least some instances it may be desirable to combine the operations of the two processors such that they operate on the print data substantially simultaneously by mathematically combining the operations performed by each of them. The order of application of the processes may also be reversed. The halftoning techniques themselves are well known in the art and therefore will not be discussed further here.

Figure 3:
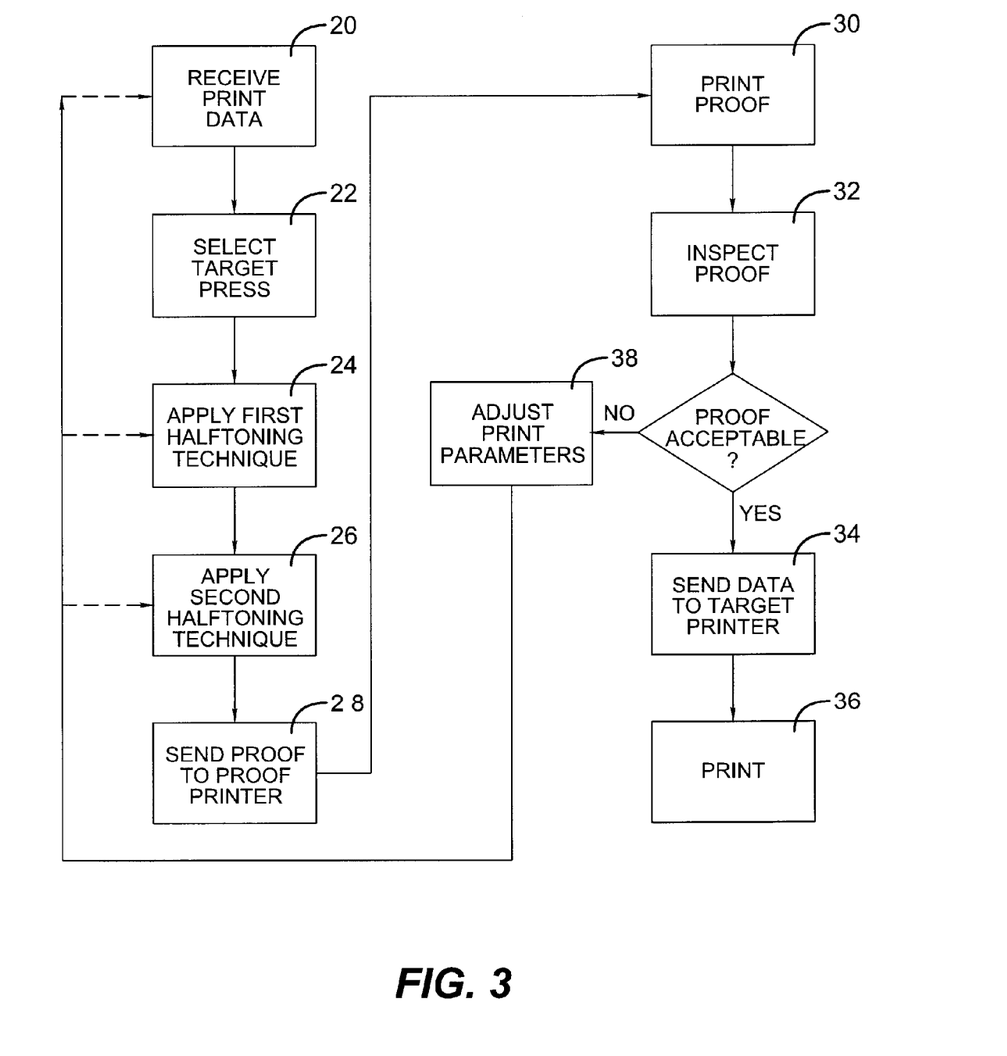
FIG. 3 is a flowchart illustrating the operation of the system of FIG. 1.

Referring to FIG. 3, overall operation of the system 10 begins with the receipt of digital print data (step 20), such as from storage, and the selection of a target press (step 22). Selection of the target printer by the user effectively selects one of a series of CMYK value sets for the selected target press. Note that while in this embodiment the press operates by pressing plates on a printing medium, the term is intended to cover any type of target printing device that a proofer can be used to simulate.

The first halftoning processor 14 then applies the first halftoning technique to the data (step 24), and the second halftoning processor 16 applies the second halftoning technique to the resulting data (step 26). These data are then sent to the proofer 18 and printed (steps 28, 30). The resulting proof can then be inspected by an operator to determine whether the output is acceptable (step 32). If the proof is acceptable, the data as processed by the first halftoning processor can be sent to the target printer and printed (steps 34, 36). If the proof is not acceptable, the operator can adjust one or more print parameters (step 38) before generating another proof. These adjustments may include changes to the print data or to parameters of the first halftoning operation. They may also include changes to parameters of the second halftoning operation, such as in the case of a color calibration or correction. Any of these changes may be performed manually, or it may be automated (e.g., using a spectrophotometer) to achieve feedback control of the relevant parameters.

Figure 4:
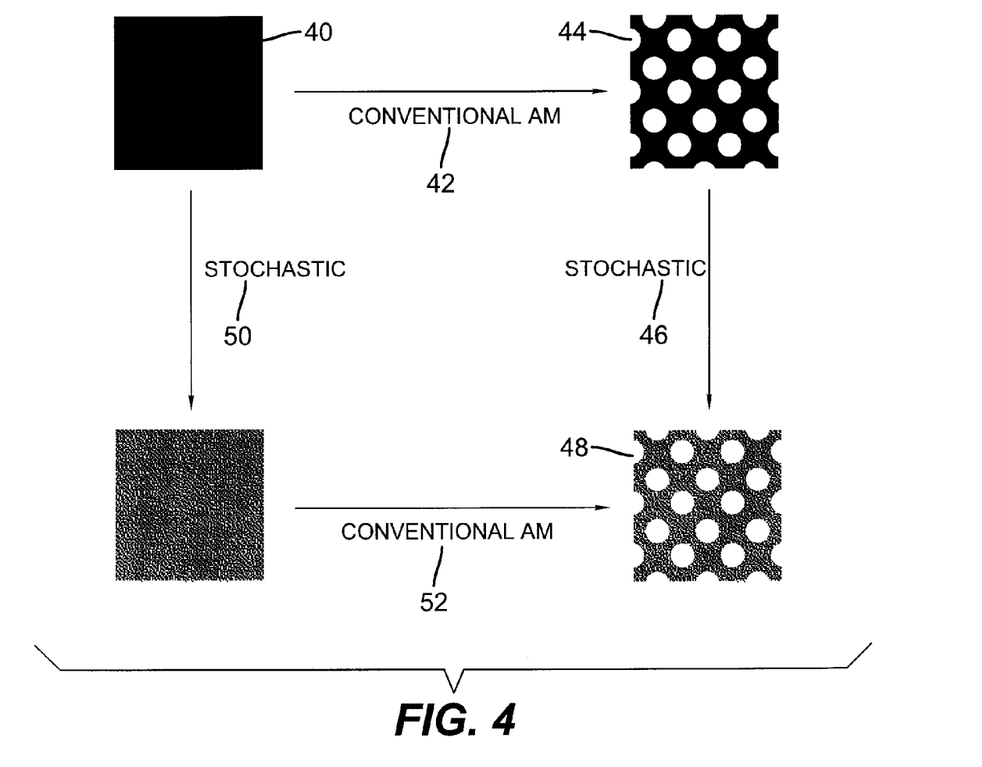
FIG. 4 is a flowchart illustrating the second set of halftoning operations performed during the operation of the system of FIG. 1.

Referring to FIG. 4, data representing a square 40 to be printed with a target primary or spot color can be converted to a conventional halftone representation 44 by applying a conventional halftoning technique 42. This representation can then be printed on the printing press or on the proofer, but unless the CMYK values for the colorants used by the two devices are the same the color of the box in their output will differ. By applying the stochastic halftoning operation 46 to the conventional halftone representation, however, the one or more colors represented by the conventional halftone representation can be tinted to result in a twice-halftoned representation 48 that more closely matches the color of printing the conventional halftone representation on the target press. The Moiré pattern of this representation should also match that of the target press. Note that the order of the halftoning operations can be reversed by applying a stochastic halftoning operation 50 followed by a conventional halftoning operation 52, which can be applied in the form of a mask.

Figure 5:
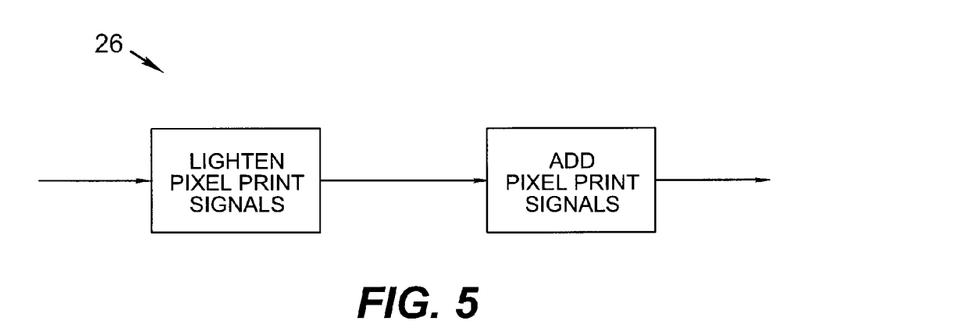
FIG. 5 is a schematic state diagram for the system of FIG. 1.
Figure 6:
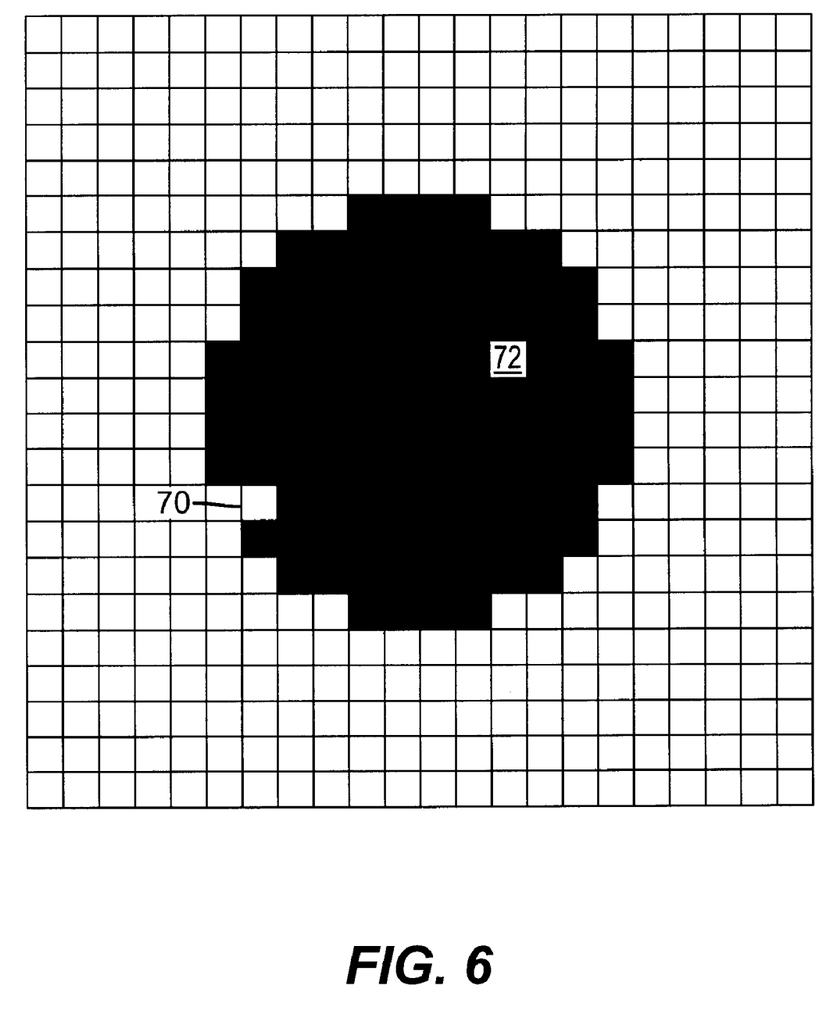
FIG. 6 is a schematic diagram showing an enlarged halftone dot as printed by the system of FIG. 1.

Referring to FIGS. 5 and 6, the tinting can be carried out by adding areas of colorant, lightening areas of colorant, or both. Adding colorant areas results in one or more smaller areas of different primary or spot colors being defined on a primary color dot. For example, a plurality of pixel-sized areas of a first color 62, 64 (e.g., magenta) and a plurality of pixel-sized areas of a second color 66, 68 (e.g., yellow) can be added to a dot of a third color (e.g., cyan). Addition of colorant to a dot can take place by actually printing one ink on top of the other (overlaying) or by printing the added colorant at a particular position and refraining from printing the underlying dot color at that position (substituting). The use of high-chroma inks allows a variety of target colors to be reproduced.

Lightening areas of colorant generally involves refraining from printing one or more pixels within a dot (see e.g., pixels 70, 72), thereby reducing the apparent saturation of the dot. Where a proofer can print pixels with different densities, partial lightening may be performed by reducing print density of a pixel instead of refraining from printing it. In one embodiment, ink is selected such that default dots are printed with some blank pixels, allowing the user to increase or decrease their saturation.

The lightening and addition processes are particularly well suited to use with proofers that employ pixels exhibiting at least some overlap. This can make added or lightened pixels less apparent. High-resolution ink-jet printers are particularly well suited to such a task, as they can be made to exhibit some degree of overlap between adjacent deposited drops. In one embodiment, promising results were obtained from an ink-jet printer exhibiting an overlap sufficient to cause surrounding pixels to completely cover the lightened pixels. Ink-jet printers also have the advantage of producing relatively transparent marks on the page, resulting in reduced visibility of added drops.

It is also preferable to use more, smaller areas, such as individual pixels, for both lightening and addition, and to distribute them over the surface of the dots. This makes the effects of the double-halftoning less conspicuous, particularly where dots overlap. As resolution of the proofer is increased, tinting pixels can be distributed more evenly, making them less noticeable. The required resolution will depend on a number of factors, including the target press's resolution and the quality of the print jobs to be proofed.

Note that in the present embodiment lightened pixels can fall on or near the edge of a halftone dot, and this can lead to a slight perceived irregularity in the shape of the dot under magnification. It has also been observed, however, that at least in some instances dots exhibiting this type of irregularity tend to actually resemble dots produced by the target press more than the more perfect-looking dots that would otherwise be produced.

Figure 7:
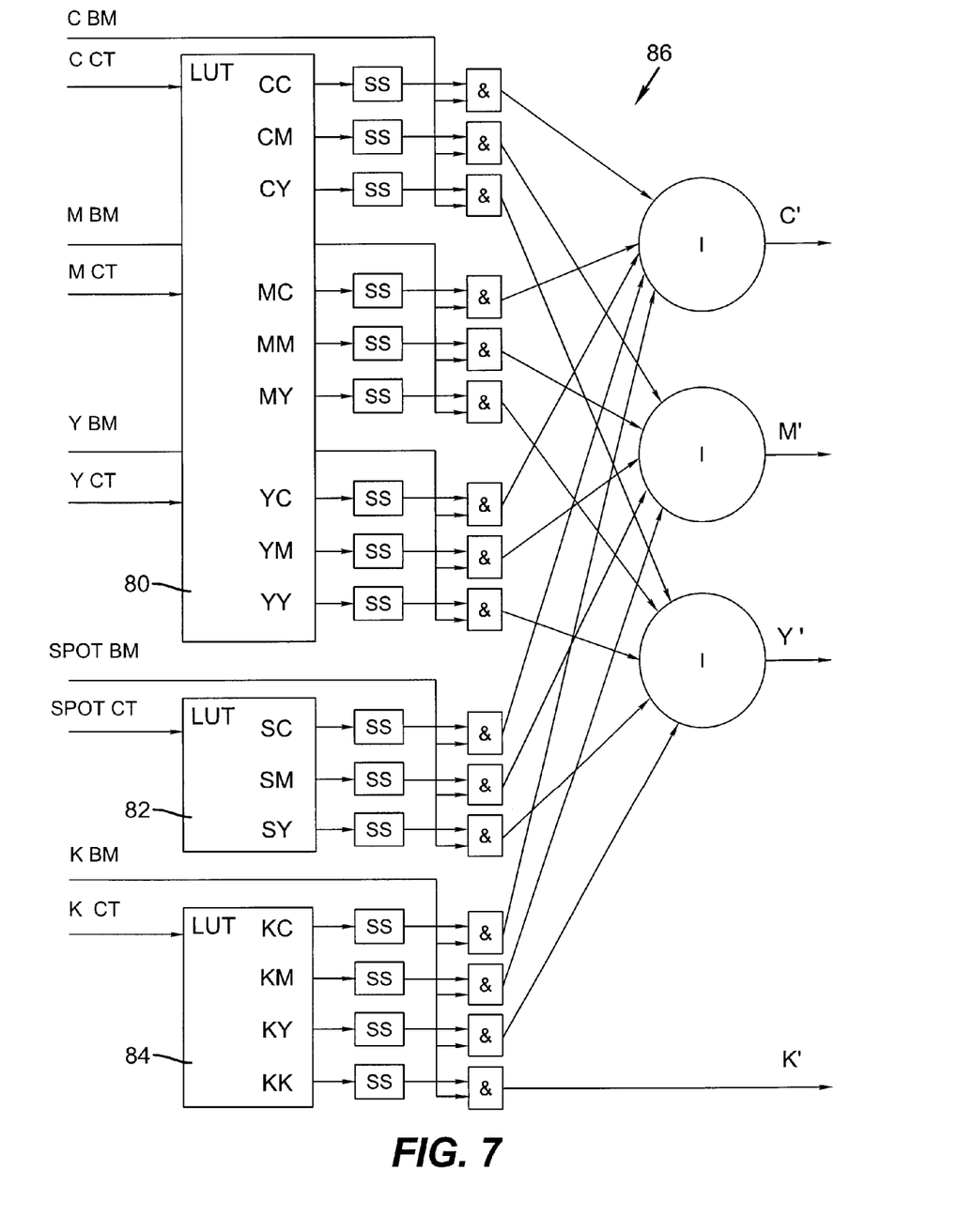
FIG. 7 is a block diagram of an implementation of portions of the system of FIG. 1.

Referring to FIG. 7, the tinting process for CMYK and a spot color can be implemented using three look-up tables 80, 82, 84 and a multi-stage combinatorial logic circuit 86. The first look-up table 80 receives three primary color continuous tone separations C CT, M CT, and Y CT at its address inputs. The look-up tables determine an amount of contamination for each screen dot and, for the case of CM and Y, ensure that the overprints are color correct as well.

The outputs of the look-up tables are each provided to the input of a high frequency stochastic screening module SS. The resulting outputs are then masked with the screened separations C BM, M BM, and Y BM in a logical AND operation &. This ensures that the color contamination will appear only in the actual screen dot. The screened bitmap separations BM are prescreened at the native machine resolution.

The output data (C'M'Y'K') data to the actual ink channels are the summation or logical OR of the different components from the different separations. This allows the image to be printed on a single pass.

There appear to be a few limitations using the above-described method. First, the color gamut of the inks needs to exceed that of the process colors. If it does not, contamination may not be possible, since the ink may have already been used by the primary color. In addition, yellow screen dots may not contaminate very well. A small drop of cyan, for instance will be quite noticeable. It is therefore preferable to start with a yellow ink that has a hue which is very close to that used by the target press.

A few simplifications may allow for a reduction in the computational power required. First, if the hue of the cyan and magenta is chosen such that it will always require yellow contamination, then some of the calculations will not have to be done, because there is no magenta in the cyan and vice versa. This may also have the benefit of less noticeable contamination. In addition, black can be assumed orthogonal since CMY are not considered when it is printed. If the overprint of CM and Y is close in color, the CMY LUT can be split into separate C, M, and Y LUTs, and this can greatly simplify calibration. Note that although it is not shown in FIG. 7, it also possible to extend the concept such as to use additional primary colors and spot colors, and/or to add tint colors to black.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

The invention claimed is:

1. A proof generation method for proof printers, comprising the steps of:
   receiving halftoned primary color print data to be printed on a target halftone printing press, wherein the halftoned primary color print data has been produced by a first halftoning technique, and wherein the first halftoning technique is at least comparable to a target halftoning technique used by the target halftone printing press,
   applying a second halftoning technique to the print data, wherein the first and second halftoning techniques are different, and
   providing the data to a proofing printer different from the target halftone printing press, wherein the first and second halftoning techniques are selected to:
   (a) cause a dot size in the data provided to the proofing printer to substantially match a dot size for the halftone printing press; and
   (b) cause a proof produced by the proofing printer to substantially match the color of a print produced by the target halftone printing press.

2. The method of claim 1 wherein the step of applying a first halftoning technique applies a half-toning technique that employs constantly spaced dots of variable sizes and wherein the step of applying a second halftoning technique applies a stochastic halftoning technique to the constantly spaced dots of variable sizes.

3. The method of claim 1 wherein the print data are color print data including a plurality of color-separated data subsets and wherein the step of applying a first halftoning technique and the step of applying a second halftoning technique are applied to the data subsets.

4. The method of claim 3 wherein the step of applying a first halftoning technique employs dots from a first set of primary colors and wherein the step of applying a second halftoning technique adds at least a second of the primary colors to a portion of one or more of the dots assigned to a first of the primary colors based on the first halftoning technique.

5. The method of claim 4 wherein the step of applying a first halftoning technique employs dots from a first set of primary colors and wherein the step of applying a second halftoning technique adds at least a first additional color to a portion of one or more of the dots assigned to a first of the primary colors based on the first halftoning technique.

6. The method of claim 3 wherein the step of applying a first halftoning technique employs dots from a first set of primary colors and wherein the step of applying a second halftoning technique adds at least a first additional color to a portion of one or more of the dots assigned to a first of the primary colors based on the first halftoning technique.

7. The method of claim 1 further including the steps of receiving a target printing press selection command and selecting parameters for the second halftoning technique based on the target printing press selection command.

8. The method of claim 1 wherein the step of applying a first halftoning technique and the step of applying a second halftoning technique are applied as part of a single simultaneous process.

9. The method of claim 1 further including the step of printing the data with an ink-jet proofing printer different from the target halftone printing press.

10. The method of claim 1 wherein the step of applying a first halftoning technique employs dots and wherein the step of applying a second halftoning technique results in lightening colorant values for at least some areas of at least some of the dots from the first halftoning technique.

11. The method of claim 1 wherein the step of applying a first halftoning technique employs dots and wherein the step of applying a second halftoning technique causes the complete lightening of colorant values for at least some areas of at least some of the dots from the first halftoning technique.

12. The method of claim 1 wherein the step of applying a first halftoning technique employs dots and wherein the step of applying a second halftoning technique causes the substitution of colorant from at least some areas of at least some of the dots from the first halftoning technique with a different colorant.

13. The method of claim 1 wherein the step of applying a first halftoning technique employs dots and wherein the step of applying a second halftoning technique causes the overlaying of a different colorant on at least some areas of at least some of the dots from the first halftoning technique.

14. The method of claim 1 wherein the step of applying a first halftoning technique employs dots and wherein the step of applying a second halftoning technique causes the creation of a plurality of areas of a same color within at least some of the dots from the first halftoning technique.

15. The method of claim 1 wherein the step of applying a first halftoning technique employs dots and wherein the step of applying a second halftoning technique causes the creation of a plurality of areas as individual pixels.

16. The method of claim 1 further including the step of receiving spot color print data for a same print job for which the primary color print data is received, and wherein the step of applying a first halftoning technique is applied to the spot color print data in addition to the primary color data.

17. The method of claim 1 wherein the step of receiving, the step of applying a second halftoning technique, and/or a step of applying the first halftoning technique are at least partially combined such that the steps of applying the first and second techniques overlap at least in part.

18. A proof generation apparatus for proof printers, comprising:
   a primary color print data input responsive to a first halftone processor employing a first halftone technique, wherein the first halftoning technique is at least comparable to a target halftoning technique used by the target halftone printing press, a second halftone processor employing a second halftone technique, wherein the first and second halftoning techniques are different and are selected to:
(a) cause a dot size in the data provided to the print data input to substantially match a dot size for the halftone printing press; and
(b) substantially match the color of a print produced by the target halftone printing press, and a processed primary color print data output.

19. A proof generation apparatus for proof printers, comprising:
means for receiving primary color print data to be printed on a target halftone printing press from means for applying a first halftoning technique to the print data, wherein the first halftoning technique is at least comparable to a target halftoning technique used by the target halftone printing press,
means for applying a second halftoning technique to the print data, wherein the first and second halftoning techniques are different and are selected to:
(a) cause a dot size in the data provided to the proofing printer to substantially match a dot size for the halftone printing press; and
(b) cause a proof produced by the proofing printer to substantially match the color of a print produced by the target halftone printing press, and
means for providing the data to a proofing printer different from the target halftone printing press.

20. A proof generation method for ink jet proof printers, comprising the steps of:
receiving print data to be printed on a target halftone printing press to which a first halftoning technique has been applied to obtain screen image data representing a plurality of screen dots, which yield a shaded visual representation of the image when printed on a printing press,
creating one or more lightened areas where direct deposition of colorant is to be lightened inside the edge of at least some of the screen dots to be printed but where indirect deposition colorant from overlapping areas is to remain by refraining from printing a subset of pixels within the periphery of a dot, wherein the method is optimized to accurately reproduce the shaded visual image that would be printed on the printing press by:
(a) causing a dot size in the data provided to the proofing printer to substantially match a dot size for the halftone printing press; and
(b) causing a proof produced by the proofing printer to substantially match the color of a print produced by the target halftone printing press.

21. The method of claim 20 further including a step of receiving an adjustment signal and a step of adjusting parameters of the step of lightening in response to the step of receiving a user adjustment signal.

22. The method of claim 20 further including the step of printing the data with overlapping dots for the overlapping raster pattern using an ink-jet proofing printer different from the target halftone printing press.

23. The method of claim 22 wherein the steps of creating and providing are adapted to produce complete overlap of the lightened areas.

24. The method of claim 20 wherein the step of creating creates the lightened areas as individual pixels.

25. A proof generation apparatus for ink jet proof printers, comprising:
a print data input responsive to a series of screen dots from first halftone processor employing a first halftoning technique, wherein the plurality of dots yield a shaded visual representation of the image when printed on a printing press,
embodied lightening logic for creating one or more lightened areas where direct deposition of colorant is to be lightened inside the edge of at least some of the screen dots to be printed but where indirect deposition colorant from overlapping areas is to remain, and wherein the apparatus is optimized to accurately reproduce a shaded visual image that would be printed on the printing press by:
(a) causing a dot size in the data provided to the proofing printer to substantially match a dot size for the halftone printing press; and
(b) causing a proof produced by the proofing printer to substantially match the color of a print produced by the target halftone printing press, and
a processed print data output for providing the data to an ink-jet proofing printer different from the target halftone printing press and capable of printing the overlapping areas.

26. A proof generation apparatus for ink jet proof printers, comprising:
means for receiving print data to be printed on a target halftone printing press to which a first halftoning technique has been applied to obtain screen image data representing a plurality of screen dots, which yield a shaded visual representation of the image when printed on a printing press,
means for creating one or more lightened areas where direct deposition of colorant is to be lightened inside the edge of at least some of the screen dots to be printed but where indirect deposition colorant from overlapping areas is to remain, wherein the apparatus is optimized to accurately reproduce the shaded visual image that would be printed on the printing press by:
(a) causing a dot size in the data provided to the proofing printer to substantially match a dot size for the halftone printing press; and
(b) causing a proof produced by the proofing printer to substantially match the color of a print produced by the target halftone printing press, and
means for providing the data to an ink-jet proofing printer different from the target halftone printing press and capable of printing the overlapping areas.

* * * * *